US00RE49382E

(19) United States
(12) Reissued Patent
Virkler

(10) Patent Number: US RE49,382 E
(45) Date of Reissued Patent: Jan. 24, 2023

(54) HIGH PRESSURE ROTOR DISK

(71) Applicant: Raytheon Technologies Corporation, Farmington, CT (US)

(72) Inventor: Scott D. Virkler, Ellington, CT (US)

(73) Assignee: Raytheon Technologies Corporation, Farmington, CT (US)

(21) Appl. No.: 17/011,472

(22) Filed: Sep. 3, 2020

Related U.S. Patent Documents

Reissue of:
(64) Patent No.: 17,011,472
Issued: Sep. 3, 2020
Appl. No.: 13/713,257
Filed: Dec. 13, 2012

U.S. Applications:
(60) Provisional application No. 61/707,009, filed on Sep. 28, 2012.

(51) Int. Cl.
*F01D 5/02* (2006.01)
*F01D 5/30* (2006.01)

(52) U.S. Cl.
CPC ..... *F01D 5/02* (2013.01); *F01D 5/3007* (2013.01); *F05D 2200/00* (2013.01); *F05D 2240/20* (2013.01); *F05D 2240/24* (2013.01)

(58) Field of Classification Search
CPC ..... F01D 5/00; F01D 5/02; F01D 5/30; F01D 5/3007; F05D 2240/00; F05D 2240/20; F05D 2240/24; F05D 2240/242; F05D 2200/00; F05D 2200/14; F05D 2200/30
See application file for complete search history.

(56) References Cited

U.S. PATENT DOCUMENTS 2,080,425 A * 5/1937 Lysholm ..... F01D 25/246 415/138
4,784,572 A 11/1988 Novotny et al.
4,836,750 A 6/1989 Modafferi et al.
4,844,694 A * 7/1989 Naudet ..... F16B 35/041 415/199.5
4,850,187 A * 7/1989 Siga et al. ..... C22C 38/44 60/39.37
5,067,876 A * 11/1991 Moreman, III ..... F01D 5/3007 416/219 R
5,292,385 A 3/1994 Kington
5,632,600 A 5/1997 Hull
(Continued)

FOREIGN PATENT DOCUMENTS

EP 1058772 B1 10/2002
EP 1424465 A1 6/2004
(Continued)

OTHER PUBLICATIONS

English translation of JP-S61234207-A retrieved from EPO's Espacenet website.*
(Continued)

*Primary Examiner* — Peter C English
(74) *Attorney, Agent, or Firm* — Carlson, Gaskey & Olds, P.C.

(57) ABSTRACT

A rotor disk for a gas turbine engine is disclosed and formed to enable operation at high rotational speeds in a high temperature environment. The rotor disk is formed to include a bore, a live rim diameter and an outer diameter related to each other according to defined relationships.

23 Claims, 2 Drawing Sheets

(56) References Cited

U.S. PATENT DOCUMENTS

| | | | | |
|---|---|---|---|---|
| 5,860,789 | A | 1/1999 | Sekihara et al. | |
| 6,183,641 | B1 * | 2/2001 | Conrad et al. | A47L 5/22 209/12.1 |
| 6,382,903 | B1 | 5/2002 | Caruso et al. | |
| 6,749,400 | B2 | 6/2004 | Dougherty et al. | |
| 6,893,226 | B2 | 5/2005 | Phipps | |
| 7,241,111 | B2 | 7/2007 | Harding et al. | |
| 7,578,656 | B2 | 8/2009 | Higgins et al. | |
| 7,819,632 | B2 | 10/2010 | Hoell et al. | |
| 2007/0059158 | A1 * | 3/2007 | Alvanos et al. | F02C 7/18 415/115 |
| 2007/0258813 | A1 * | 11/2007 | Klutz | F01D 5/087 416/90 R |
| 2009/0053058 | A1 * | 2/2009 | Kohlenberg et al. | F02K 1/72 415/227 |
| 2009/0208339 | A1 * | 8/2009 | Cherolis | F01D 5/3007 416/219 R |
| 2012/0291449 | A1 * | 11/2012 | Adams | F02C 7/36 60/793 |

FOREIGN PATENT DOCUMENTS

| | | | |
|---|---|---|---|
| EP | 1927722 | A1 | 6/2008 |
| JP | S61234207 | A * | 10/1986 |

OTHER PUBLICATIONS

Petition for Inter Partes Review of U.S. Pat. No. 10,119,400. *General Electric Company, Petitioner*, v. *United technologies Corporation*, Patent Owner. IPR2020-00346. Dec. 23, 2019.
Declaration of Reza Abhari, Ph.D. In re U.S. Pat. No. 10,119,400. Executed Dec. 11, 2019. pp. 1-96.
Curriculum Vitae of Reza S. Abhari. pp. 1-24.
Alver, A. S. and Wong, J. K. (1975). Improved turbine disk design to increase reliability of airciall jet engines. NASA/CR-134985. pp. 1-64.
NASA Technical Reports Server (NTRS) for Alver NASA/CR-134985.
Fledderjohn, K.R. (1983). The TFE731-5: Evolution of a decade of business jet service. SAE 1983 Transactions. Section 3—vol. 92. Society of Automotive Engineers, Inc. Warrendale, PA. pp. 3.146-3.157.
Howe, D. C. and Marchant, R. D. (1988). Energy Efficient Engine. High-pressure compressor test hardware detailed design report. NASA/CR-180580. pp. 1-233.
NASA Technical Reports Server (NTRS) for Howe NASA/CR-180850.
Barack, W. N. and DOMAS P. A. (1976). An improved turbine disk design to increase reliablity of aircraft jet engines. NASA/CR-135033 pp. 1-131.
Roberts, R., Fiorentino, A. J., and Diehl, L. A. (1977). Pollution reduction Technology Program for class T4 (JT8D) engines. NASA Document ID 19780003124. pp. 59-89.
NASA Technical Reports Server (NTRS) for Roberts NASA Document ID 19780003124.
Declaration of Ingrid Hsieh-Yee, PHD, Under37 C.F.R. § 1.68. Executed Dec. 3, 2019. IPR2020-00346. pp. 1-77.
Mattingly, J.D. (1996). Elements of gas turbine propulsion. New York, New York: McGraw-Hill, Inc. pp. 1-15, 60-62, 85-87, 95-104, 121-123, 223-234, 323-326, 462-479, 517-520, 563-565, 673-675, 682-684, 697-699, 703-705, 302-805, 862-864.
Muktinutalapati, N. R. (2011). Materials for gas turbines—An overview. Advances in Gas Turbine Technology, pp. 293-314.
Declaration of Courtney H. Bailey. In re U.S. Pat. No. 8,511,605 B2. Executed Jul. 19, 2016. pp. 1-4.
What is the NTRS?—NASA Scientific and Technical Information (STI) Program, https://sti.nasa.gov/what-is-the-ntrs/#.X0zufXIKiUk.
Patent Owner's Preliminary Response. *General Electric Company, Petitioner*, v. *Raytheon Technologies Corporation, Patent Owner*. IPR2020-00346. Apr. 15, 2020.
Mattingly, J.D. (1996). Elements of gas turbine propulsion. New York, New York: McGraw-Hill, Inc. pp. 392-411, 615-756.
AirInsight. Breakthrough: The Market Changing Pratt & Whitney Geared Turbofan Engine. Jul. 2014. pp. 1-58.
Pratt & Whitney GTF Engine Revenue Flight Hours Triple in 2019. Dec. 18, 2019. https://newsroom.aviator.aero/pratt-whitney-gtf-engine-revenue-flight-hours-triple-in-2019/.
Decision. Denying Institution of Inter Partes Review 35 U.S.C. § 314. *General Electric Company, Petitioner*, v. *Raytheon Technologies Corporation, Patent Owner*. IPR2020-00346. Jun. 23, 2020.
International Preliminary Report on Patentability for International Application No. PCT/US2013/061319, dated Apr. 9, 2015.
International Preliminary Report on Patentability for PCT Application No. PCT/US2013/061319, dated Apr. 9, 2015.
International Search Report and Written Opinion for International Application No. PCT/US2013/061319 dated Jul. 3, 2014.

* cited by examiner

HIGH PRESSURE ROTOR DISK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED [APPLICATION] *APPLICATIONS*

This application *is a broadening reissue of U.S. Pat. No. 10,119,400 (filed as U.S. application Ser. No. 13/713,257), which* claims priority to U.S. Provisional Application No. 61/707,009 filed on Sep. 28, 2012.

BACKGROUND

A gas turbine engine typically includes a fan section, and a core engine section including a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Turbine and compressor rotor disks operate at high speeds and support blades. Exhaust gases produced in the combustor drive a rotor disk within the turbine section and thereby rotation of a corresponding rotor disk within the compressor section. The turbine disk is attached to drive a shaft that in turn drives the compressor or the fan section.

Engine manufactures continuously seek improvements to thermal, weight and propulsive efficiencies. Improvements to engine architectures have enabled higher speeds and operation at increased temperatures. Accordingly, it is desirable to develop rotor disks that perform at higher speeds and greater temperatures.

SUMMARY

A gas turbine engine according to an exemplary embodiment of this disclosure, among other possible things includes a compressor section including a high pressure compressor and a low pressure compressor. A combustor is in fluid communication with the compressor section. A turbine section is in fluid communication with the combustor. The turbine section includes a high pressure turbine driving the high pressure compressor and a low pressure turbine driving the low pressure compressor. At least one of the high pressure turbine and the high pressure compressor includes a disk having a bore diameter (D) related to a bore width (W) according to a ratio (D/W) between about 1.25 and about 1.65.

In a further embodiment of the foregoing gas turbine engine, the ratio (D/W) is between about 1.35 and about 1.55.

In a further embodiment of any of the foregoing gas turbine engines, the ratio (D/W) is about 1.45.

In a further embodiment of any of the foregoing gas turbine engines, the ratio (D/W) is equal to 1.45.

In a further embodiment of any of the foregoing gas turbine engines, the disk includes an outer diameter (OD) related to the bore diameter (D) according to a ratio (OD/D) that is between about 2.95 and about 3.25.

In a further embodiment of any of the foregoing gas turbine engines, the ratio (OD/D) is between about 3.04 and 3.20.

In a further embodiment of any of the foregoing gas turbine engines, the ratio (OD/D) is about 3.15.

In a further embodiment of any of the foregoing gas turbine engines, the ratio (OD/D) is equal to 3.15.

In a further embodiment of any of the foregoing gas turbine engines, the disk includes a live rim diameter (d) related to the bore diameter (D) according to a ratio (d/D) that is between about 2.25 and about 3.00.

In a further embodiment of any of the foregoing gas turbine engines, the ratio (d/D) is between about 2.50 and about 2.75.

In a further embodiment of any of the foregoing gas turbine engines, the ratio (d/D) is about 2.69.

In a further embodiment of any of the foregoing gas turbine engines, the ratio (d/D) is equal to about 2.69.

A rotor disk for a gas turbine engine according to an exemplary embodiment of this disclosure, among other possible things includes an outer diameter (OD) related to a bore diameter (D) according to a ratio (OD/D) that is between about 2.95 and about 3.25.

In a further embodiment of the foregoing rotor disk, the ratio (OD/D) is between about 3.04 and 3.20.

In a further embodiment of any of the foregoing rotor disks, the ratio (OD/D) is about 3.15.

In a further embodiment of any of the foregoing rotor disks, the bore diameter (D) is related to a bore width (W) according to a ratio (D/W) between about 1.25 and about 1.65.

In a further embodiment of any of the foregoing rotor disks, the ratio (D/W) is between about 1.53 and about 1.55.

In a further embodiment of any of the foregoing rotor disks, the ratio (D/W) is about 1.45.

In a further embodiment of any of the foregoing rotor disks, the disk includes a live rim diameter (d) related to the bore diameter (D) according to a ratio (d/D) that is between about 2.25 and about 3.00.

In a further embodiment of any of the foregoing rotor disks, the ratio (d/D) is between about 2.50 and about 2.75.

In a further embodiment of any of the foregoing rotor disks, the ratio (d/D) is about 2.69.

A method of fabricating a rotor disk for a gas turbine engine according to an exemplary embodiment of this disclosure, among other possible things includes forming a bore which includes a bore diameter (D) and a live rim diameter (d) with a ratio (d/D) of the live rim diameter (d) to the bore diameter (D) being between about 2.25 and about 3.00, forming at least one lug for mounting a blade at a live rim diameter (d), and forming an outer diameter (OD).

In a further embodiment of the foregoing method, includes forming the disk to include a ratio (OD/D) of the outer diameter (OD) to the bore diameter (D) between about 2.95 and about 3.25.

In a further embodiment of any of the foregoing methods, includes forming a bore including a bore diameter (D) and a bore width (W) in a direction parallel to an axis of intended rotation. The bore diameter (D) is related to the bore width (W) according to a ratio (D/W) that is between about 1.25 and 1.65.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
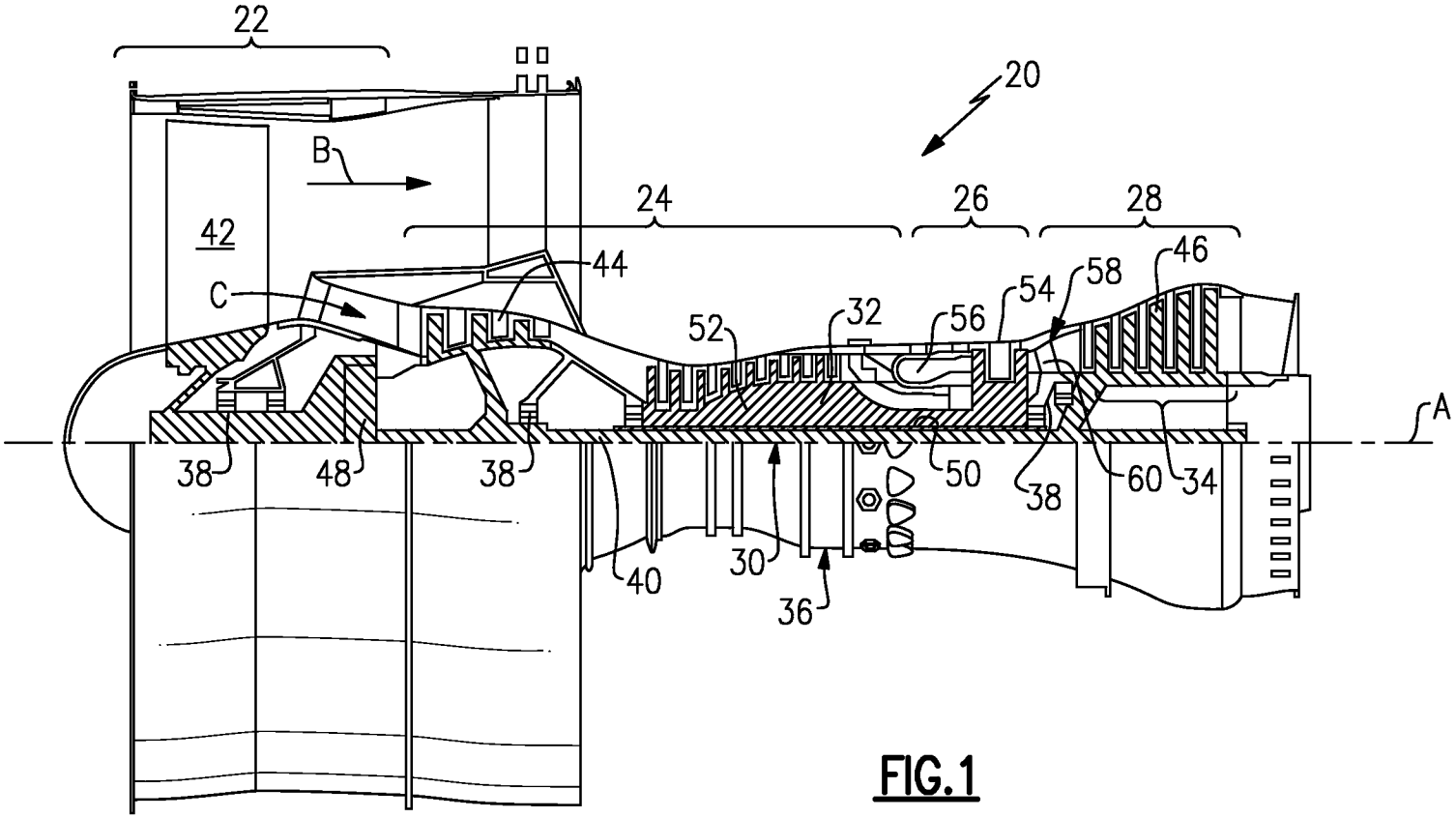
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram}\ ^\circ\ \text{R})/(518.7^\circ\ \text{R})]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

As appreciated, although an engine for mounting and powering an aircraft is described and shown, the present disclosure may also provide benefits to land based and industrial gas turbine engines.

Figure 2:
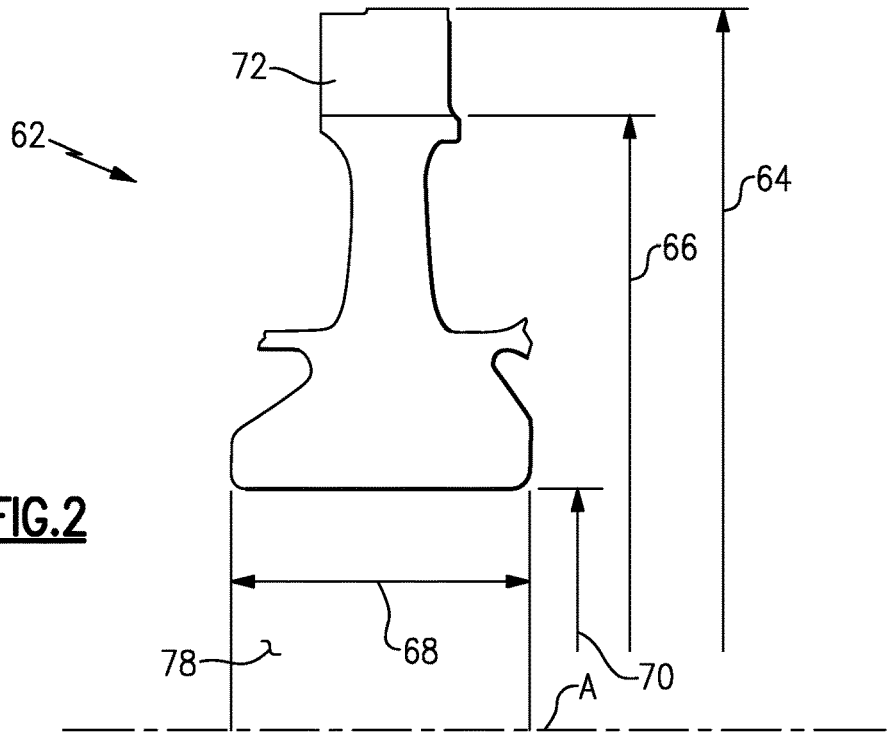
FIG. 2 is a cross-section of an example rotor disk for a gas turbine engine.
Figure 3:
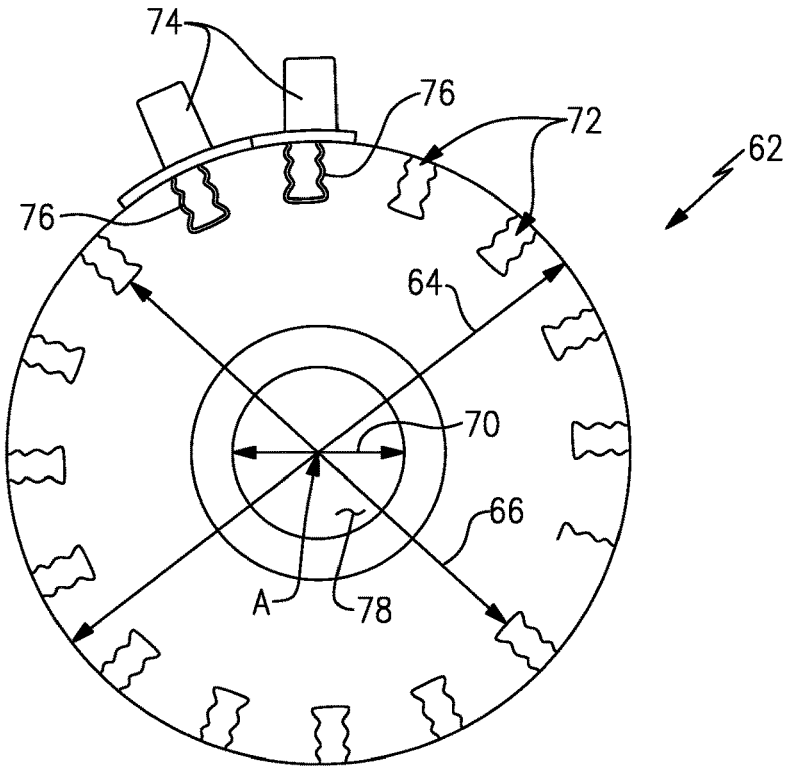
FIG. 3 is a front view of the example rotor disk for a gas turbine engine.

Referring to FIGS. 2 and 3, with continued reference to FIG. 1, an example rotor disk 62 is shown and includes a plurality of lugs 72 for supporting blades 74 (FIG. 3). The example rotor disk 62 is provided as part of the high pressure turbine 54. However, the example rotor disk may also be part of the high pressure compressor 52.

The rotor disk 62 supports the turbine blades 74 that are driven by high speed exhaust gases generated in the combustor section 26. The example turbine disk 62 includes an outer diameter 64, a live rim diameter 66 and a bore 78 having a bore diameter 70. The bore 78 includes a width 68 in a direction parallel to the axis A.

The bore diameter 70 is that diameter between an inner most surface of the bore 78 about the axis A. The live rim disk diameter 66 is the diameter that extends between bottom and radially inward surfaces of the disk lugs 72. The turbine blades 74 are supported within the disk lugs 72 by corresponding mating profiles disposed at an interface 76.

The bore width 68 of the rotor disk 62 in this example is the greatest width on the main body of the rotor disk 62. The greatest width of the main body of the rotor disk 62 does not include additional widths associated with appendages, arms or other structures that extend from the main body of the rotor disk 62. The example bore width 68 is disposed at a distance spaced apart from the axis A determined to provide desired performance properties and to accommodate high rotational speeds encountered during operation. The example distance is defined as the bore diameter 70 (D).

The speed at which the high pressure turbine rotor disk 62 operates is accommodated at least in part by a relationship between the live rim diameter 66 (d) to the bore diameter 70 (D) defined by a ratio of the live rim diameter 66 to the bore diameter 70 (i.e., d/D). In the disclosed example embodiment the ratio is between about 2.25 and about 3.00. In another disclosed example embodiment, the ratio d/D is between about 2.50 and about 2.75. In another disclosed example embodiment the ratio d/D is about 2.69.

The disk 62 includes the bore width 68 (W). The bore width 68 (W) is the width at the bore 78 parallel to the axis A. In one non-limiting embodiment, a relationship between the bore width 68 (W) and the bore diameter 70 (D) is defined by a ratio of D/W. In a disclosed example the ratio D/W is between about 1.25 and about 1.65. In another disclosed embodiment the ratio of D/W is between about 1.35 and about 1.55. In a further embodiment the ratio of D/W is about 1.45.

The outer diameter 64 (OD) is related to the bore diameter 70 (D) by a ratio of the outer diameter 64 (OD) to the bore diameter 70 (D) (i.e., OD/D). In one example the ratio OD/D is between about 2.95 and 3.25. In another embodiment the ratio (OD/D) is between about 3.04 and 3.20. In a further embodiment the ratio (OD/D) is about 3.15.

The example rotor disk for a gas turbine engine is fabricated by forming a bore including the bore diameter (D) and the bore width (W) in a direction parallel to an axis of intended rotation according to the above disclosed ratio. Additional processing steps are performed to form at least one lug 72 at the live rim diameter 66 (d). Further, the outer diameter 64(OD) is formed according to the above defined ratios. Fabrication further includes forming the rotor disk to include the ratio (OD/D) of the outer diameter (OD) to the bore diameter (D) as disclosed above. The fabrication further includes forming the rotor disk to include the ratio (d/D) of the live rim diameter (d) to the bore diameter (D) as disclosed above.

The example rotor disk 62 is fabricated from a material capable of withstanding rotational speeds and temperatures encountered during operation of the gas turbine engine. The rotor disk 62 can be formed from any material or combination of materials such as for example nickel-based alloys and carbon steels. Moreover, it is within the contemplation of this disclosure that the example rotor disk 62 may be fabricated utilizing known fabrication and machining processes verified to enable operation of a completed rotor disk 62 within desired performance parameters within the gas turbine engine. For example, the rotor disk 62 may be fabricated as a casting or forging followed by machining to obtain the desired shape and features.

The example rotor disk includes relationships that enable performance at high rotational speeds in the high temperature environment of the high pressure turbine 54.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

~~1. A gas turbine engine comprising:~~

~~a compressor section including a high pressure compressor and a low pressure compressor;~~

~~a combustor in fluid communication with the compressor section;~~

~~a turbine section in fluid communication with the combustor, wherein the turbine section includes a high pressure turbine driving the high pressure compressor and a low pressure turbine driving the low pressure compressor, wherein at least one of the high pressure turbine and the high pressure compressor includes a disk having a bore diameter (D) related to a bore width (W) according to a ratio (D/W) between 1.25 and 1.65.~~

~~2. The gas turbine engine as recited in claim 1, wherein the ratio (DAY) is between 1.35 and 1.55.~~

[3. The gas turbine engine as recited in claim 1, wherein the ratio (D/W) is 1.45.]

4. [The gas turbine engine as recited in claim 1] *A gas turbine engine comprising:*

*a compressor section including a high pressure compressor and a low pressure compressor;*

*a combustor in fluid communication with the compressor section; and*

*a turbine section in fluid communication with the combustor, wherein the turbine section includes a high pressure turbine driving the high pressure compressor and a low pressure turbine driving the low pressure compressor, wherein at least one of the high pressure turbine and the high pressure compressor includes a disk having a bore diameter (D) related to a bore width (W) according to a ratio (D/W) between 1.25 and 1.65, and* wherein the disk includes an outer diameter (OD) related to the bore diameter (D) according to a ratio (OD/D) that is between 2.95 and 3.25.

5. The gas turbine engine as recited in claim 4, wherein the ratio (OD/D) is between 3.04 and 3.20.

6. The gas turbine engine as recited in claim 4, wherein the ratio (OD/D) is 3.15.

7. [The gas turbine engine as recited in claim 1] *A gas turbine engine comprising:*

*a compressor section including a high pressure compressor and a low pressure compressor;*

*a combustor in fluid communication with the compressor section; and*

*a turbine section in fluid communication with the combustor, wherein the turbine section includes a high pressure turbine driving the high pressure compressor and a low pressure turbine driving the low pressure compressor, wherein at least one of the high pressure turbine and the high pressure compressor includes a disk having a bore diameter (D) related to a bore width (W) according to a ratio (D/W) between 1.25 and 1.65, and* wherein the disk includes a live rim diameter (d) related to the bore diameter (D) according to a ratio (d/D) that is between 2.25 and 3.00.

8. The gas turbine engine as recited in claim 7, wherein the ratio (d/D) is between 2.50 and 2.75.

9. The gas turbine engine as recited in claim 7, wherein the ratio (d/D) is 2.69.

~~10. A rotor disk for a gas turbine engine comprising:~~

~~an outer diameter (OD) related to a bore diameter (D) according to a ratio (OD/D) that is between 2.95 and 3.25.~~

[11. The rotor disk as recited in claim 10, wherein the ratio (OD/D) is between 3.04 and 3.20.]

[12. The rotor disk as recited in claim 10, wherein the ratio (OD/D) is 3.15.]

[13. The rotor disk as recited in claim 10, wherein the bore diameter (D) is related to a bore width (W) according to a ratio (D/W) between 1.25 and 1.65.]

[14. The rotor disk as recited in claim 13, wherein the ratio (D/W) is between 1.53 and 1.55.]

[15. The rotor disk as recited in claim 13, wherein the ratio (DAY) is 1.45.]

~~16. The rotor disk as recited in claim 10, wherein the disk includes a live rim diameter (d) related to the bore diameter (D) according to a ratio (d/D) that is between 2.25 and 3.00.~~

[17. The rotor disk as recited in claim 16, wherein the ratio (d/D) is between 2.50 and 2.75.]

[18. The rotor disk as recited in claim 16, wherein the ratio (d/D) is 2.69.]

~~19. A method of fabricating a rotor disk for a gas turbine engine comprising:~~

~~forming a bore including a bore diameter (D) and a live rim diameter (d) with a ratio (d/D) of the live rim diameter (d) to the bore diameter (D) being between 2.25 and 3.00~~

~~forming at least one lug for mounting a blade at the live rim diameter (d); and~~

~~forming an outer diameter (OD).~~

~~20. The method as recited in claim 19, including forming the disk to include a ratio (OD/D) of the outer diameter (OD) to the bore diameter (D) between 2.95 and 3.25.~~

[21. The method as recited in claim 19, including forming a bore including a bore diameter (D) and a bore width (W) in a direction parallel to an axis of intended rotation, wherein the bore diameter (D) is related to the bore width (W) according to a ratio (D/W) that is between 1.25 and 1.65.]

*22. The gas turbine engine as set forth in claim 4, wherein the ratio (D/W) is between 1.35 and 1.55.*

*23. The gas turbine engine as recited in claim 4, wherein the ratio (D/W) is 1.45.*

*24. The gas turbine engine as set forth in claim 7, wherein the ratio (D/W) is between 1.35 and 1.55.*

*25. The gas turbine engine as recited in claim 7, wherein the ratio (D/W) is 1.45.*

*26. A gas turbine engine, comprising:*

*a high speed shaft mounted for rotation about a longitudinal axis;*

*a low speed shaft coupled to a fan of a fan section, the low speed shaft mounted for rotation concentrically with the high speed shaft, the low speed shaft configured to rotate at a lower speed than the high speed shaft;*

*a rotor disk of a turbine attached to the high speed shaft, the rotor disk of the turbine having a first bore diameter ($D_1$) related to a first bore width ($W_1$) according to a first ratio ($D_1/W_1$) between 1.25 and 1.65; and*

*a rotor disk of a compressor attached to the high speed shaft, the rotor disk of the compressor having a second bore diameter ($D_2$) related to a compressor outer diameter ($OD_2$) according to a second ratio ($OD_2/D_2$) between 2.95 and 3.25;*

*wherein the fan has less than 26 fan blades; and*

*further comprising a speed change device, wherein a low pressure turbine attached to the low speed shaft is configured to drive the fan through the speed change device at a lower speed than the low speed shaft.*

*27. The gas turbine engine as recited in claim 26, wherein the fan section has a low fan pressure ratio measured across the fan blades alone of less than 1.45 at a flight condition of 0.8 Mach and 35,000 ft., wherein the fan section has a low corrected fan tip speed less than 1,150 ft./sec at the flight condition of 0.8 Mach and 35,000 ft., and wherein the low corrected fan tip speed is an actual fan tip speed divided by* $((Tram\ ^\circ R)/(518.7^\circ R))^{0.5}$.

*28. The gas turbine engine as set forth in claim 26, wherein the turbine is a two stage turbine.*

*29. The gas turbine engine as set forth in claim 26, wherein the ratio ($D_1/W_1$) is between 1.35 and 1.55.*

*30. The gas turbine engine as recited in claim 26, wherein the ratio ($D_1/W_1$) is 1.45.*

*31. The gas turbine engine as recited in claim 26, wherein the ratio ($OD_2/D_2$) is between 3.04 and 3.20.*

*32. The gas turbine engine as recited in claim 26, wherein the ratio ($OD_2/D_2$) is 3.15.*

*33. A gas turbine engine, comprising:*

*a high speed shaft mounted for rotation about a longitudinal axis;*

*a low speed shaft coupled to a fan of a fan section, the low speed shaft mounted for rotation concentrically with the high speed shaft, the low speed shaft configured to rotate at a lower speed than the high speed shaft;*

*a rotor disk of a turbine attached to the high speed shaft, the rotor disk of the turbine having a first bore diameter ($D_1$) related to a first bore width ($W_1$) according to a first ratio ($D_1/W_1$) between 1.25 and 1.65;*

*a rotor disk of a compressor attached to the high speed shaft, the rotor disk of the compressor having a second bore diameter ($D_2$) related to a compressor outer diameter ($OD_2$) according to a second ratio ($OD_2/D_2$) between 2.95 and 3.25;*

*wherein the fan has less than 26 fan blades; and*

*wherein the fan section has a low fan pressure ratio measured across the fan blades alone of less than 1.45 at a flight condition of 0.8 Mach and 35,000 ft., wherein the fan section has a low corrected fan tip speed less than 1,150 ft./sec at the flight condition of 0.8 Mach and 35,000 ft., and wherein the low corrected fan tip speed is an actual fan tip speed divided by $((Tram\ ^\circ R)/(518.7^\circ R))^{0.5}$.*

*34. The gas turbine engine as set forth in claim 33, wherein the turbine is a two stage turbine.*

*35. The gas turbine engine as set forth in claim 33, wherein the ratio ($D_1/W_1$) is between 1.35 and 1.55.*

*36. The gas turbine engine as recited in claim 33, wherein the ratio ($D_1/W_1$) is 1.45.*

*37. The gas turbine engine as recited in claim 33, wherein the ratio ($OD_2/D_2$) is between 3.04 and 3.20.*

*38. The gas turbine engine as recited in claim 33, wherein the ratio ($OD_2/D_2$) is 3.15.*

* * * * *